(12) United States Patent
Miyagawa (10) Patent No.: US 11,598,279 B2
(45) Date of Patent: Mar. 7, 2023

(54) CONTROL METHOD AND CONTROL DEVICE FOR AUTOMATED VEHICLE

(71) Applicant: NISSAN MOTOR CO., LTD., Yokohama (JP)

(72) Inventor: Tomohiro Miyagawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 5 days.

(21) Appl. No.: 16/755,928

(22) PCT Filed: Oct. 26, 2017

(86) PCT No.: PCT/JP2017/038789
§ 371 (c)(1),
(2) Date: Apr. 14, 2020

(87) PCT Pub. No.: WO2019/082361
PCT Pub. Date: May 2, 2019

(65) Prior Publication Data
US 2020/0240342 A1    Jul. 30, 2020

(51) Int. Cl.
*F02D 41/10* (2006.01)
*F02D 41/12* (2006.01)
(Continued)

(52) U.S. Cl.
CPC ............ *F02D 41/10* (2013.01); *B60W 30/17* (2013.01); *B60W 30/18018* (2013.01);
(Continued)

(58) Field of Classification Search
CPC ............ F02N 11/0814; F02N 11/0837; F02N 2200/15; F02N 2300/306;
(Continued)

(56) References Cited

U.S. PATENT DOCUMENTS

2003/0087724 A1* 5/2003 Seibertz ............ F02N 11/0837
477/92
2005/0227500 A1 10/2005 Sugawara et al.
(Continued)

FOREIGN PATENT DOCUMENTS

DE   10 2008 006 028 A1   7/2009
JP   04-257739 A          9/1992
(Continued)

OTHER PUBLICATIONS

USPTO Office Action, U.S. Appl. No. 16/652,730, dated Dec. 24, 2021, 16 pages.

*Primary Examiner* — John M Zaleskas
(74) *Attorney, Agent, or Firm* — Foley & Lardner LLP (57) ABSTRACT

A control method for a self-driving vehicle provided with an engine as a driving source, comprising: determining whether or not coast stop is executed in accordance with required driving force of the vehicle, the coast stop being for automatically stopping the engine during the vehicle traveling at speed not more than predetermined vehicle speed; setting the required driving force so that an intervehicular distance between the host vehicle and a preceding vehicle becomes closer to a predetermined distance under presence of the preceding vehicle in front of the host vehicle; predicting a behavior of the preceding vehicle from a situation in front of the preceding vehicle under presence of the preceding vehicle; and prohibiting release of the coast stop for the engine during an automatic stop when future deceleration of the preceding vehicle is predicted in response to an expansion of the intervehicular distance.

4 Claims, 8 Drawing Sheets

(51) Int. Cl.
  *G06V 20/58* (2022.01)
  *B60W 30/18* (2012.01)
  *B60W 30/17* (2020.01)
  *F02N 11/08* (2006.01)

(52) U.S. Cl.
  CPC .......... *F02D 41/12* (2013.01); *F02N 11/0837* (2013.01); *G06V 20/584* (2022.01); *B60W 2510/18* (2013.01); *B60W 2510/20* (2013.01); *B60W 2520/10* (2013.01); *B60W 2520/105* (2013.01); *B60W 2554/802* (2020.02); *B60W 2554/804* (2020.02); *B60W 2555/60* (2020.02); *F02N 2200/125* (2013.01); *F02N 2300/2006* (2013.01)

(58) Field of Classification Search
  CPC .......... F02N 2300/2006; B60W 30/17; B60W 30/18018; B60W 2520/10; B60W 2520/105; B60W 2554/802; B60W 2554/804; B60W 2555/60; G06K 9/00825; F02D 41/10; F02D 41/12
  See application file for complete search history.

(56) References Cited

U.S. PATENT DOCUMENTS

| | | | | |
|---|---|---|---|---|
| 2007/0111857 | A1* | 5/2007 | De Mersseman | B60W 10/06 477/183 |
| 2009/0312933 | A1* | 12/2009 | Hoetzer | F02N 11/0837 701/102 |
| 2010/0152963 | A1* | 6/2010 | Heckel | B60W 30/17 701/29.2 |
| 2010/0191446 | A1* | 7/2010 | Mc Donald | F02N 11/0837 701/113 |
| 2011/0071746 | A1* | 3/2011 | O'Connor | F02N 11/0837 701/101 |
| 2012/0010797 | A1* | 1/2012 | Luo | G08G 1/0962 701/70 |
| 2012/0016573 | A1* | 1/2012 | Ellis | B60K 31/0008 701/112 |
| 2012/0179357 | A1* | 7/2012 | Phillips | F02N 11/0837 701/112 |
| 2013/0180500 | A1* | 7/2013 | Nishina | B60W 30/17 123/339.19 |
| 2014/0005906 | A1* | 1/2014 | Pandita | B60W 30/17 706/46 |
| 2014/0046581 | A1* | 2/2014 | Ota | G08G 1/096791 701/408 |
| 2014/0058579 | A1* | 2/2014 | Ono | G06F 17/00 701/1 |
| 2014/0257637 | A1* | 9/2014 | Sangameswaran | B60W 30/09 701/41 |
| 2014/0303868 | A1* | 10/2014 | Otake | B60W 30/18109 701/70 |
| 2014/0330479 | A1* | 11/2014 | Dolgov | B60W 30/143 701/28 |
| 2014/0358841 | A1* | 12/2014 | Ono | G08G 1/0112 706/52 |
| 2015/0057905 | A1* | 2/2015 | Niwa | B60W 30/18109 701/70 |
| 2015/0120160 | A1* | 4/2015 | Foltin | B60T 8/171 701/70 |
| 2015/0183433 | A1* | 7/2015 | Suzuki | B60W 10/08 701/96 |
| 2015/0204253 | A1* | 7/2015 | Yang | F02N 11/0837 701/113 |
| 2015/0275840 | A1* | 10/2015 | Sawada | F02N 11/0837 701/113 |
| 2015/0291171 | A1* | 10/2015 | Kuroki | B60W 10/06 701/70 |
| 2015/0314768 | A1* | 11/2015 | Wright | B60W 20/15 701/22 |
| 2016/0229402 | A1* | 8/2016 | Morita | G08G 1/163 |
| 2016/0272205 | A1* | 9/2016 | Kato | B60T 7/122 |
| 2016/0273468 | A1* | 9/2016 | Kato | B60W 30/17 |
| 2016/0304095 | A1* | 10/2016 | Fischer | B60W 10/06 |
| 2017/0001640 | A1* | 1/2017 | Asakura | F02D 41/065 |
| 2017/0106876 | A1* | 4/2017 | Gordon | B60W 30/182 |
| 2017/0226947 | A1* | 8/2017 | Kawakami | B60W 10/06 |
| 2017/0282921 | A1* | 10/2017 | Limbacher | B60W 50/0097 |
| 2018/0037226 | A1* | 2/2018 | Otake | B60W 10/04 |
| 2018/0178795 | A1* | 6/2018 | Takada | F02N 11/0837 |
| 2018/0265089 | A1* | 9/2018 | Inaba | F01M 1/02 |
| 2018/0273047 | A1* | 9/2018 | Wang | B60W 30/18109 |
| 2018/0328330 | A1* | 11/2018 | Terahata | B60H 1/00778 |
| 2019/0017486 | A1* | 1/2019 | Kuretake | B60W 10/06 |
| 2019/0118798 | A1* | 4/2019 | Kuretake | B60W 50/0098 |
| 2019/0118812 | A1* | 4/2019 | Kuretake | B60L 15/00 |
| 2020/0079374 | A1* | 3/2020 | Duan | B60W 30/18018 |
| 2020/0298890 | A1* | 9/2020 | Miyagawa | B60W 10/02 |

FOREIGN PATENT DOCUMENTS

| | | | |
|---|---|---|---|
| JP | 6-297982 A | 10/1994 | |
| JP | 2004-204747 A | 7/2004 | |
| JP | 2009-528213 A | 8/2009 | |
| JP | 2012-047148 A | 3/2012 | |
| JP | 2012-091695 A | 5/2012 | |
| JP | 2015-68213 A | 4/2015 | |
| JP | 2015068213 A * | 4/2015 | |
| JP | 2017-15030 A | 1/2017 | |
| WO | WO-03001055 A1 * | 1/2003 | ...... B60W 30/18018 |
| WO | WO-2012161815 A1 * | 11/2012 | ........... H03L 7/0995 |
| WO | WO-2016/042882 A1 | 3/2016 | |

* cited by examiner

CONTROL METHOD AND CONTROL DEVICE FOR AUTOMATED VEHICLE

TECHNICAL FIELD

The present invention relates to a control method and a control device for an self-driving vehicle, the control method and the control device automatically stopping an engine while a vehicle is traveling.

BACKGROUND ART

JP2004-204747 discloses a technology that stops fuel supply to an engine and stops the engine automatically when a vehicle is decelerating as a brake pedal is depressed by a driver. Therefore, an unnecessary fuel consumption is suppressed during the deceleration, and it is thus possible to reduce a fuel consumption.

SUMMARY OF INVENTION

In JP2004-204747, after the engine is stopped automatically, the engine is restarted when a driver's requirement for acceleration by release of the brake pedal is determined.

There is a demand that control for automatically stopping the engine during vehicle traveling is introduced to an self-driving vehicle.

For example, as control for an self-driving vehicle in a case where a preceding vehicle is present in front of an host vehicle, there is control as described below that causes the host vehicle to follow the preceding vehicle. Regarding this control, an intervehicular distance between the host vehicle and the preceding vehicle is detected, and, relative speed of the host vehicle to the preceding vehicle is also detected. Thus, driving force of an engine is controlled so that the relative speed becomes 0 under a predetermined intervehicular distance.

However, with the foregoing control, acceleration and deceleration of the host vehicle depend only on a relative traveling state of the host vehicle to the preceding vehicle. In other words, it is a behavior of the preceding vehicle viewed from the host vehicle. Therefore, the following problem arises along with an attempt to employ the automatic stop control for the engine.

When the preceding vehicle accelerates and decelerates repeatedly, the engine starts and stops repeatedly in order to adjust the intervehicular distance in response to the change thereof. For example, the engine that has been stopped due to automatic stop control is restarted in response to an expansion of the intervehicular distance due to acceleration of the preceding vehicle, and then the engine is stopped in accordance with a reduction of the intervehicular distance. Thus, when the engine is started and stopped repeatedly, especially when these operations are repeated in a short period, an effect of a reduction of fuel consumption by the automated stop of the engine is largely lessened. In addition, it is concerned that fuel efficiency may be worsened due to introduction of the automatic stop control.

An object of the invention is to provide a control method and a control device for an self-driving vehicle in consideration of the above problems.

As an aspect, a control method for an self-driving vehicle is provided. The control method of the embodiment is a control method for an self-driving vehicle provided with an engine as a driving source. The control method includes determining whether or not coast stop is executed in accordance with required driving force of the vehicle, the coast stop being for automatically stopping the engine during the vehicle traveling at speed not more than predetermined vehicle speed, and setting the required driving force so that an intervehicular distance between the host vehicle and a preceding vehicle becomes closer to a predetermined distance under presence of the preceding vehicle in front of the host vehicle. Further, the control method includes predicting a behavior of the preceding vehicle from a situation in front of the preceding vehicle under presence of the preceding vehicle; and prohibiting release of the coast stop for the engine during an automatic stop when future deceleration of the preceding vehicle is predicted in response to an expansion of the intervehicular distance.

An another aspect of the control method is a control method for an self-driving vehicle provided with an engine as a driving source. The control method includes determining whether or not coast stop is executed in accordance with required driving force of the vehicle, the coast stop being for automatically stopping the engine during the vehicle traveling at speed not more than predetermined vehicle speed, and setting the required driving force so that an intervehicular distance between the host vehicle and a preceding vehicle becomes closer to a predetermined distance under presence of the preceding vehicle in front of the host vehicle. Further, the control method includes predicting a behavior of the preceding vehicle from a situation in front of the preceding vehicle under presence of the preceding vehicle; and prohibiting execution of the coast stop for the engine during an operation of the engine when future acceleration of the preceding vehicle is predicted in response to a reduction of the intervehicular distance.

As a further aspect, a control device for an self-driving vehicle is provided.

DESCRIPTION OF EMBODIMENTS

Hereinafter, an embodiment of the invention is described with reference to the drawings.

(Entire Configuration)

Figure 1:
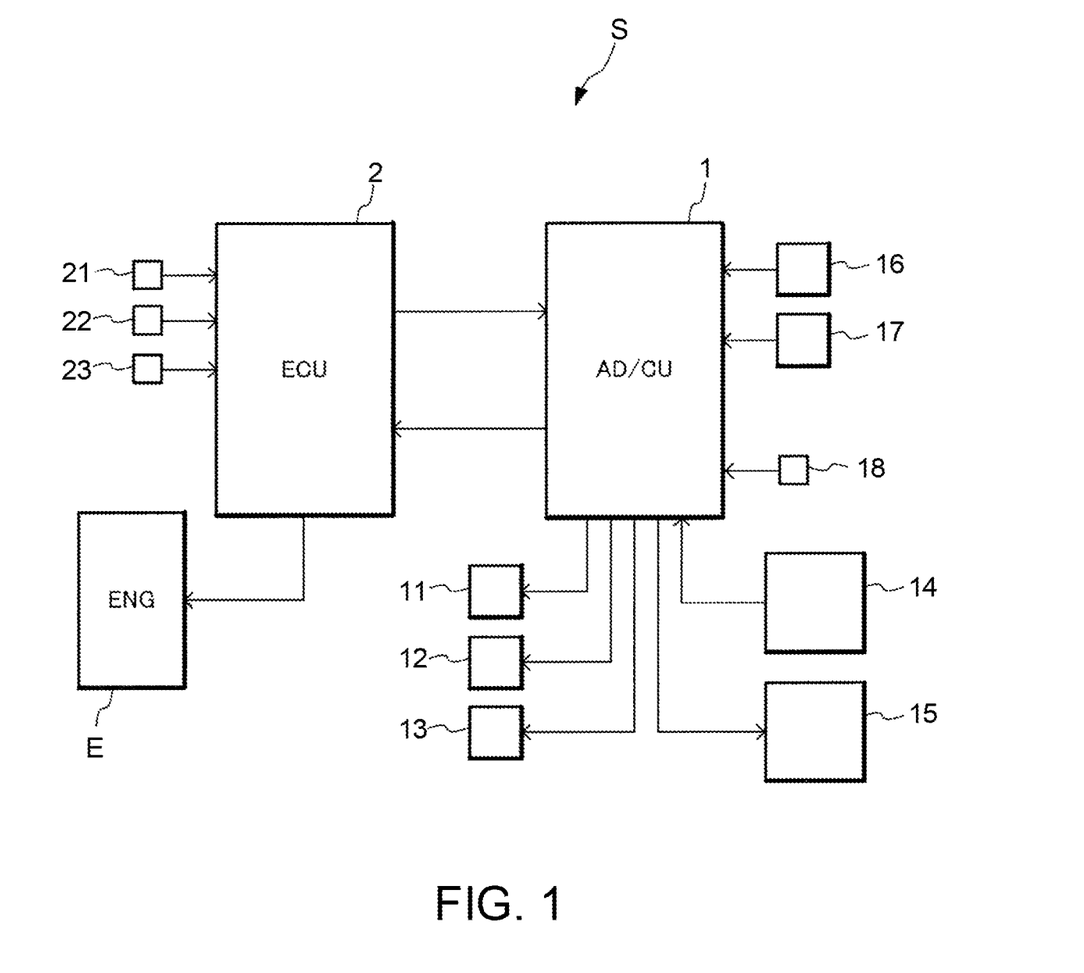
FIG. 1 is a schematic view of an entire configuration of a control device for an self-driving vehicle according to an embodiment of the invention.

FIG. 1 is a schematic view of an entire configuration of a control device (hereinafter, referred to as a "vehicle control system") S for an self-driving vehicle according to the embodiment of the invention.

The vehicle control system S includes an internal combustion engine (hereinafter, simply referred to as an "engine") E serving as a driving source of a vehicle, an advanced driver assistance system control unit (ADAS/CU) 1, and an engine controller (ECU) 2. The engine controller 2 controls operations of the engine E, and controls an output of the engine E by adjusting an intake air quantity, an amount of fuel supply, and so on to the engine E. The engine controller 2 is connected to the advanced driver assistance system control unit 1 so that they are able to communicate with each other. As information regarding the engine control, a signal from an accelerator sensor 21 that detects an operation amount of an accelerator pedal by a driver, a signal from a revolution speed sensor 22 that detects revolution speed of the engine E, a signal from a water-temperature sensor 23 that detects temperature of coolant for the engine E, and so on are input to the engine controller 2.

The advanced driver assistance system control unit 1 sets various control parameters regarding self-driving of the vehicle, and outputs command signals to various equipment (for example, the engine E) related to the self-driving. In this embodiment, the "self-driving" means a driving state in which all operations of acceleration, braking, and steering are done on a system side in a state where the vehicle is able to return to driver's manual driving anytime by choice of the driver under the surveillance by the driver. However, a category of automation and a level of the self-driving to which this embodiment is applicable are not limited to this.

As devices related to the self-driving of a vehicle, the vehicle control system S includes an automated steering device 11, an automated wheel brake device 12, and automated parking brake device 13, in addition to the engine E. Any of the automated steering device 11, the automated wheel brake device 12, and the automated parking brake device 13 can be operated in accordance with a command signal from the advanced driver assistance system control unit 1. The automated steering device 11 is a device that changes a traveling direction of the vehicle during the self-driving. The automated wheel brake device 12 is a device that generates braking force in the vehicle without an operation of a brake pedal by a driver. The automated parking brake device 13 is a device that operates a parking brake automatically when a system start switch of the vehicle is turned off.

Further, the vehicle control system S includes a switching device 14, and a display device 15. The switching device 14 is used to switch between the self-driving and the manual driving by choice of the driver, and to set traveling conditions at the time of the self-driving. The display device 15 causes the driver to recognize an operation state of the self-driving and a traveling state of the vehicle. In this embodiment, the switching device 14 includes an operation part. The operation part is configured as an intensive switch (hereinafter, referred to as a "handle switch") provided adjacent to a grip part of a steering wheel, and is used to switch on and off the self-driving, change set vehicle speed and a set intervehicular distance, and start the vehicle by the self-driving from temporary stop of the vehicle. The display device (hereinafter, referred to as a "meter display") 15 is installed in a dashboard for a driver's seat. The display device 15 is configured so as to make the on and off states of the self-driving visually recognized (for example, different display colors are used for the on and off states of the self-driving, respectively), and includes a display part that displays the set vehicle speed and a set intervehicular distance.

In this embodiment, each of the advanced driver assistance system control unit 1 and the engine controller 2 is configured as an electronic control unit including a central processing unit (CPU), various storage devices such as ROM and RAM, and a microcomputer including an input-output interface and so on.

The advanced driver assistance system control unit 1 receives an input of a signal from the handle switch 14, as well as a signal from a preceding vehicle detecting unit 16, and a signal from an intervehicular distance measuring device 17 as information regarding the self-driving. The preceding vehicle detecting unit 16 detects presence of a preceding vehicle in a range of a predetermined distance in front of the host vehicle. In this embodiment, the preceding vehicle detecting unit 16 is an optical camera sensor, detects presence of the preceding vehicle, and also functions as means for acquiring information regarding a situation in front of the preceding vehicle. Here, "situation in front of the preceding vehicle" is specifically a color of a traffic signal in front of the preceding vehicle in a traveling direction of the preceding vehicle (hereinafter, referred to as a "front traffic signal"). The intervehicular distance measuring device 17 may be, for example, a radar sensor, and a millimeter wave radar sensor may be employed. As described above, in this embodiment, the preceding vehicle detecting unit 16 and the intervehicular distance measuring device 17 are embodied by different types of sensors (a camera sensor 16 and a radar sensor 17), respectively. However, the invention is not limited to these, and the preceding vehicle detecting unit 16 and the intervehicular distance measuring device 17 may be embodied by the same type of sensors, such as use of a plurality of camera sensors.

In addition to above, the advanced driver assistance system control unit 1 also receives an input of a signal from a vehicle speed sensor 18 that detects vehicle speed VSP.

Once the self-driving is selected due to the operation of the handle switch 14, the vehicle control system S sets required acceleration or required driving force for the vehicle in accordance with the traveling state of the host vehicle, a traveling state of a vehicle other than the host vehicle (for example, the preceding vehicle), surrounding traffic situation, and so on. The advanced driver assistance system control unit 1 sets the required driving force, and outputs a command signal to the engine controller 2 so as to cause the engine E to generate output torque in accordance with the required driving force. The self-driving is canceled when the driver operates the handle switch 14 or performs some kind of operation related to a behavior of the vehicle (for example, depression of the brake pedal).

In addition to the above-mentioned control at normal time, the vehicle control system S also executes coast stop control for stopping fuel supply to the engine E during deceleration of the vehicle so that the engine E is stopped automatically. Specifically, when the vehicle is decelerating at speed not more than coast stop permission speed VSP1 (for example, 10 km/hour), the coast stop control is executed. Further, when the vehicle is traveling in traffic congestion, the vehicle control system S executes control of permitting or prohibiting execution of the coast stop that automatically stops the engine E that is operating, and permitting or prohibiting restart of the engine E that is automatically stopped by the coast stop, depending on a situation in front of the preceding vehicle.

Figure 2:
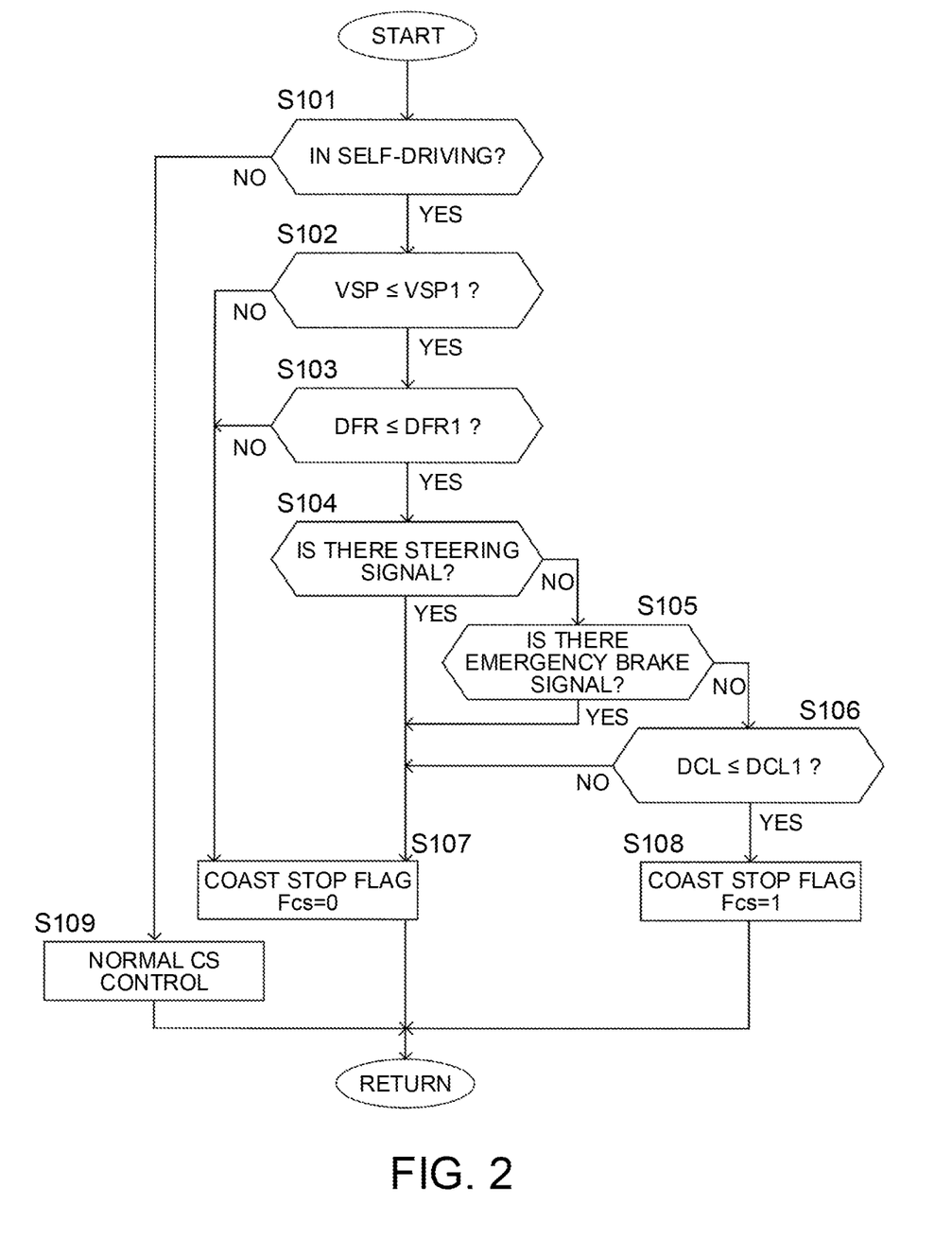
FIG. 2 is a flowchart showing a basic flow of coast stop control according to the embodiment.
Figure 3:
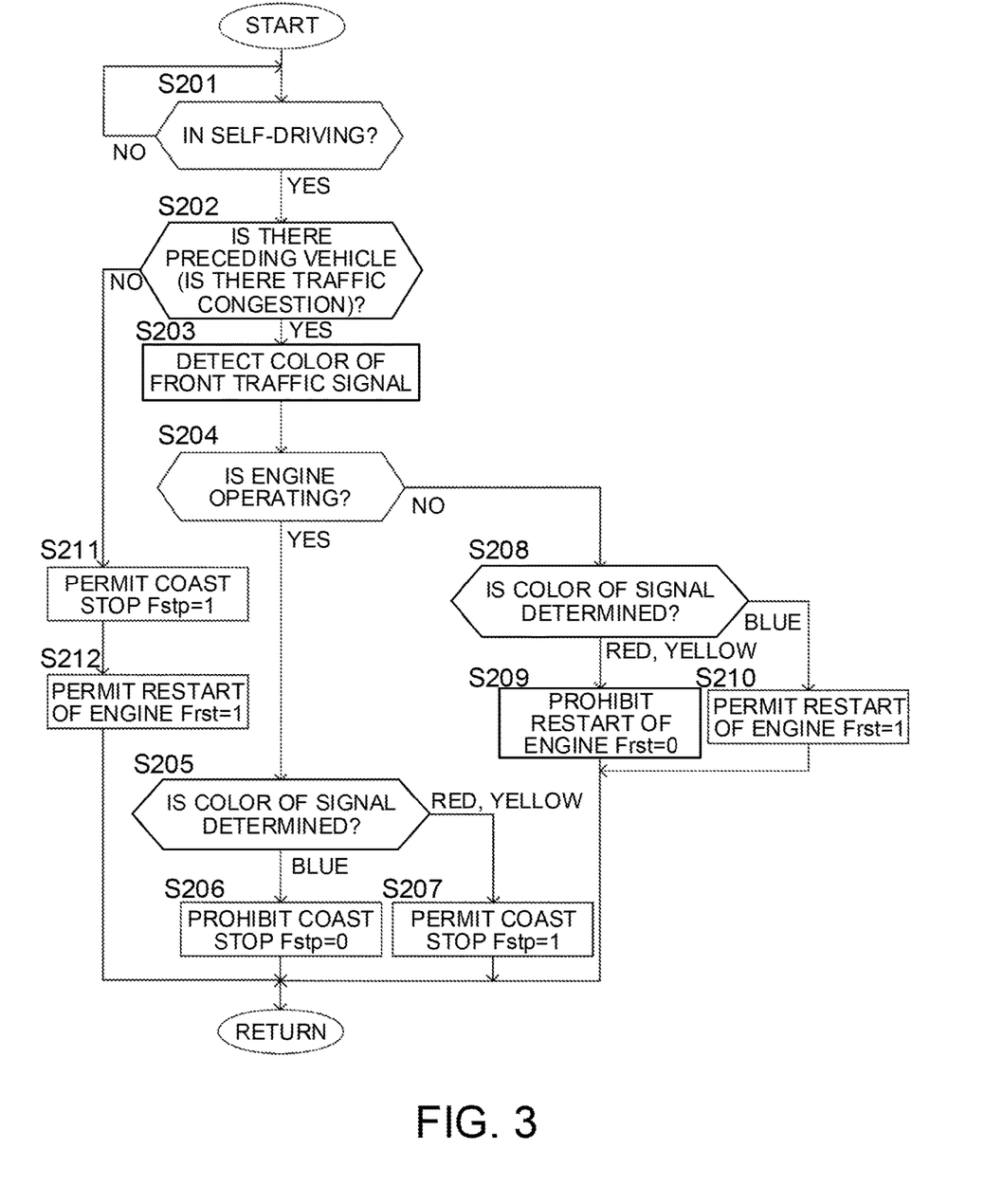
FIG. 3 is a flowchart describing processing for determining cancellation permission for execution of coast stop in the coast stop control according to the embodiment.
Figure 4:
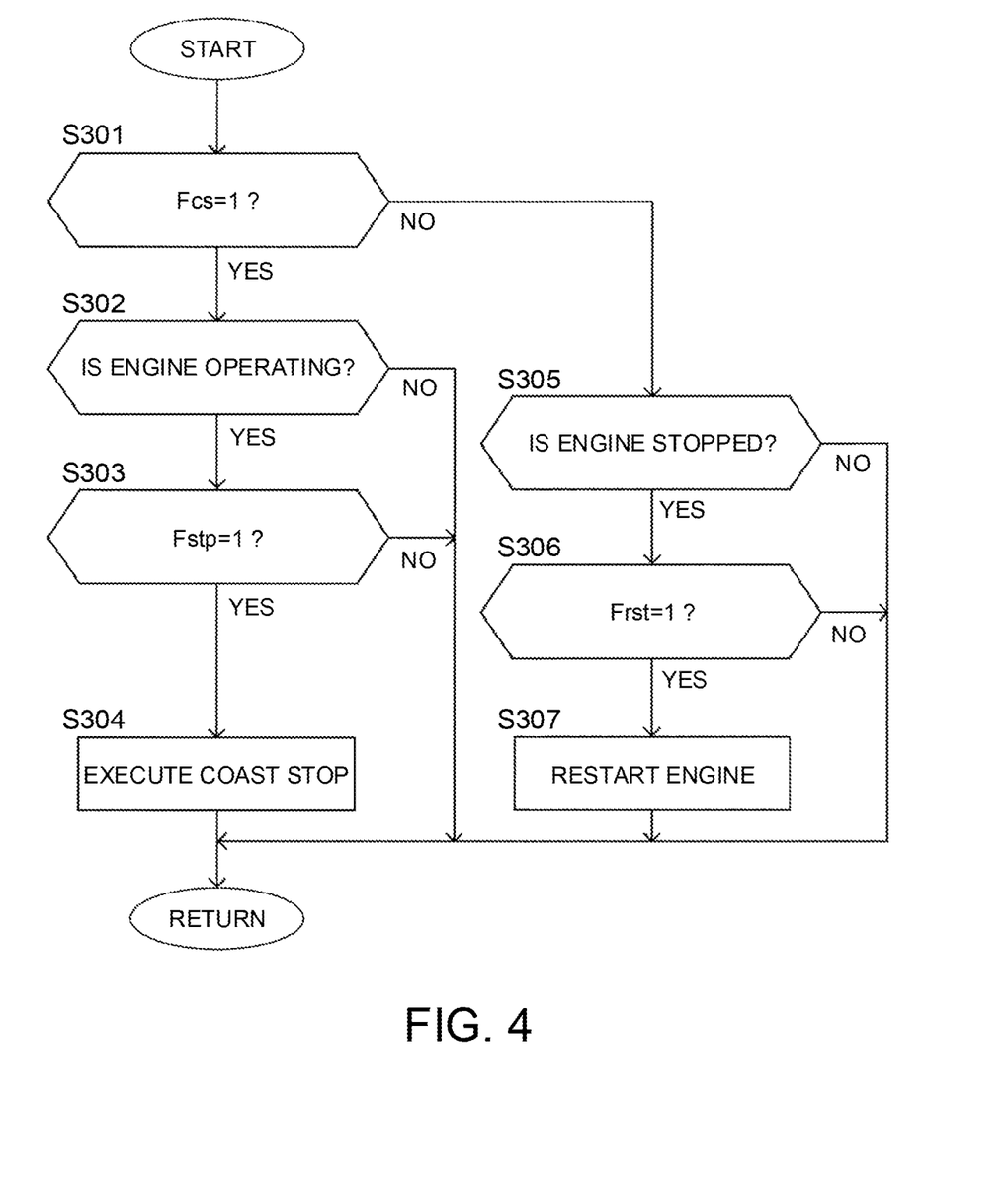
FIG. 4 is a flowchart describing processing for cancellation of execution of the coast stop in the coast stop control according to the embodiment.

FIG. 2 to FIG. 4 are flowcharts describing control executed by the advanced driver assistance system control unit 1 with respect to the coast stop control. FIG. 2 shows a basic flow of the coast stop control according to this embodiment, and FIG. 3 and FIG. 4 describe processing executed when the vehicle is traveling in traffic congestion (processing for determining cancellation permission for execution of the coast stop, processing for cancellation of execution of the coast stop) as a part of the coast stop control. The advanced driver assistance system control unit 1 is programmed so as to execute the control or the processing at every given time. The execution cycles of the control shown in FIG. 2 to FIG. 4 may be the same as or different from each other.

In the flowchart shown in FIG. 2, in S101, it is determined whether or not the self-driving is being performed. It is possible to determine whether or not the self-driving is being performed based on a signal from the handle switch 14. When it is determined that the self-driving is being performed, the control moves on to S102, and when it is determined that the self-driving is not being performed, the control moves on to S109.

In S102, it is determined whether or not the vehicle speed (hereinafter, simple "vehicle speed" means vehicle speed of the host vehicle) VSP is not more than the coast stop permission speed VSP1 (for example, 10 km/hour). When the vehicle speed VSP is not more than the coast stop permission speed VSP1, the control moves on to S103, and, when the vehicle speed VSP is higher than the coast stop permission speed VSP1, the control moves on to S107.

In S103, it is determined whether or not required driving force DFR of the vehicle is equal to or smaller than a given value DFR1. The given value DFR1 is set to a value that indicates that the vehicle is required to decelerate, and, it is a negative value in this embodiment. This means that, in S103, it can also be said that it is processing for determining whether or not braking force equal to or higher than a given value is required for the vehicle. When braking force is required for the vehicle, the advanced driver assistance system control unit 1 outputs a command signal to the automated wheel brake device 12, and causes the automated wheel brake device 12 to generate required braking force. Here, when the vehicle is traveling in traffic congestion, the advanced driver assistance system control unit 1 detects vehicle speed VSP of the host vehicle, the relative speed RVS of the host vehicle to the preceding vehicle, and the intervehicular distance D between the host vehicle and the preceding vehicle based on signals from the camera sensor 16 and the radar sensor 17, and controls driving force of the engine E so that the relative speed RVS becomes 0 when the intervehicular distance D is the predetermined distance Dset.

In S104, it is determined whether or not there is a steering signal from the advanced driver assistance system control unit 1 to the automated steering device 11. When there is the steering signal, such as when the vehicle is traveling on a curved road, the control moves on to S107 in order to make the engine E keep operating, considering that the vehicle may require driving force even though the vehicle is decelerating. When there is no steering signal, the control moves on to S105.

In S105, it is determined whether or not there is an emergency brake signal from the advanced driver assistance system control unit 1 to the automated wheel brake device 12. When there is the emergency brake signal, such as when there is a pedestrian who is running out or an obstacle in front of the host vehicle is detected, the control moves on to S107 in order to make the engine E keep operating so as to suppress a drop of supply voltage required for an emergency operation of the automated wheel brake device 12. When there is no emergency brake signal, the control moves on to S106.

In S106, it is determined whether or not a deceleration DCL of the vehicle is not more than a given value DCL1. When the deceleration DCL is not more than the given value DCL1, the control moves on to S108. Meanwhile, when the deceleration DCL is higher than the given value DCL1, the control moves on to S107 in order to avoid execution of the coast stop with excessively high deceleration.

In S107, a coast stop flag Fcs is set to 0.

In S108, the coast stop flag Fcs is set to 1.

In S109, the coast stop control for normal driving (in other words, manual driving) is executed. Specifically, fuel supply to the engine E is stopped when the vehicle speed VSP while a brake pedal is depressed by a driver is not more than the coast stop permission speed VSP1, thereby stopping the engine E. Then, when the foot of the driver is parted from the brake pedal and the brake pedal is returned to its original position, fuel supply to the engine E is restarted, thereby restarting the engine E.

Moving on to description of the flowchart shown in FIG. 3 (the processing for determining cancellation permission for execution of the coast stop), in S201, it is determined whether or not the vehicle is in self-driving. When the vehicle is in the self-driving, the control moves on to S202, and, when the vehicle is not in the self-driving, the processing of S201 is executed repeatedly.

In S202, it is determined whether or not there is a preceding vehicle. Specifically, based on a signal from the camera sensor 16, it is determined whether or not there is a preceding vehicle in the same lane as that of the host vehicle within a range of a predetermined distance in front of the host vehicle. When there is a preceding vehicle, the control moves on to S203, and, when there is no preceding vehicle, the control moves on to S211.

In S203, a color of the front traffic signal is detected as a situation in front of the preceding vehicle. The advanced driver assistance system control unit 1 is able to analyze and discriminate the color of the front traffic signal based on a signal from the camera sensor 16.

In S204, it is determined whether or not the engine E is operating. When the engine E is operating, the control moves on to S205, and, when the engine E is not operating (in other words, when the engine E is automatically stopped due to the coast stop), then the control moves on to S208.

In S205, the color of the front traffic signal detected in S203 is determined. When the color of the signal is blue, the control moves on to S206, and when the color of the signal is a color other than blue (specifically, red or yellow), the control moves on to S207. Here, "red" and "yellow" are signal colors that encourage the vehicle in front of the traffic signal to stop or decelerate. When the color of the signal is either of them, it is possible to predict deceleration of the preceding vehicle. Meanwhile, "blue" is a signal color that permits a vehicle in front of the traffic signal to pass, and it is possible to predict acceleration of the preceding vehicle.

In S206, a coast stop permission flag Fstp is set to 0, prohibiting execution of the coast stop for the engine E that is operating.

In S207, the coast stop permission flag Fstp is set to 1, permitting execution of the coast stop for the engine E that is operating.

In S208, it is determined whether the color of the front traffic signal is red or yellow, or blue. When the color of the signal is red or yellow, the control moves on to S209, and when the color of the signal is blue, the control moves on to S210.

In S209, an engine restart permission flag Frst is set to 0 so that cancellation of the coast stop for the engine E that is automatically stopped by the coast stop is prohibited. In other words, restart of the engine E is prohibited.

In S210, the engine restart permission flag Frst is set to 1 so that restart of the engine E that is automatically stopped by the coast stop is permitted.

In S211, the coast stop permission flag Fstp is set to 1 so that execution of the coast stop is permitted.

In S212, the engine restart permission flag Frst is set to 1 so that restart of the engine E that is automatically stopped by the coast stop is permitted.

Moving on to description of the flowchart shown in FIG. 4 (processing for cancellation of execution of the coast stop), in S301, it is determined whether or not the coast stop flag Fcs is 1, in other words, it is determined whether or not a given condition regarding execution of the coast stop is satisfied. When the coast stop flag Fcs is 1, the control moves on to S302, and when the coast stop flag Fcs is not 1, the control moves on to S305.

In S302, it is determined whether or not the engine E is operating. When the engine E is operating, the control moves on to S303, and, when the engine E is not operating, the control by this routine is ended, and the coast stop is continued, and the engine E is kept stopped.

In S303, it is determined whether or not the coast stop permission flag Fstp is 1. When the coast stop permission flag Fstp is 1, the control moves on to S304, and when the coast stop permission flag Fstp is not 1, it is considered that execution of the coast stop is prohibited, and the control by this routine is ended as it is in order to keep the engine E operating.

In S304, the coast stop is executed, and the engine E is stopped.

In S305, it is determined whether or not the engine E is stopped. When the engine E is stopped, the control moves on to S306, and, when the engine E is not stopped, the control by this routine is ended, and the engine E is kept stopped.

In S306, it is determined whether or not the engine restart permission flag Frst is 1. When the engine restart permission flag Frst is 1, the control moves on to S307, and, when the engine restart permission flag Frst is not 1, it is considered that restart of the engine E is prohibited, and the control by this routine is ended as it is in order to continue the coast stop.

In S307, the coast stop is cancelled, and fuel supply to the engine E is restarted so that the engine E is restarted.

Figure 5:
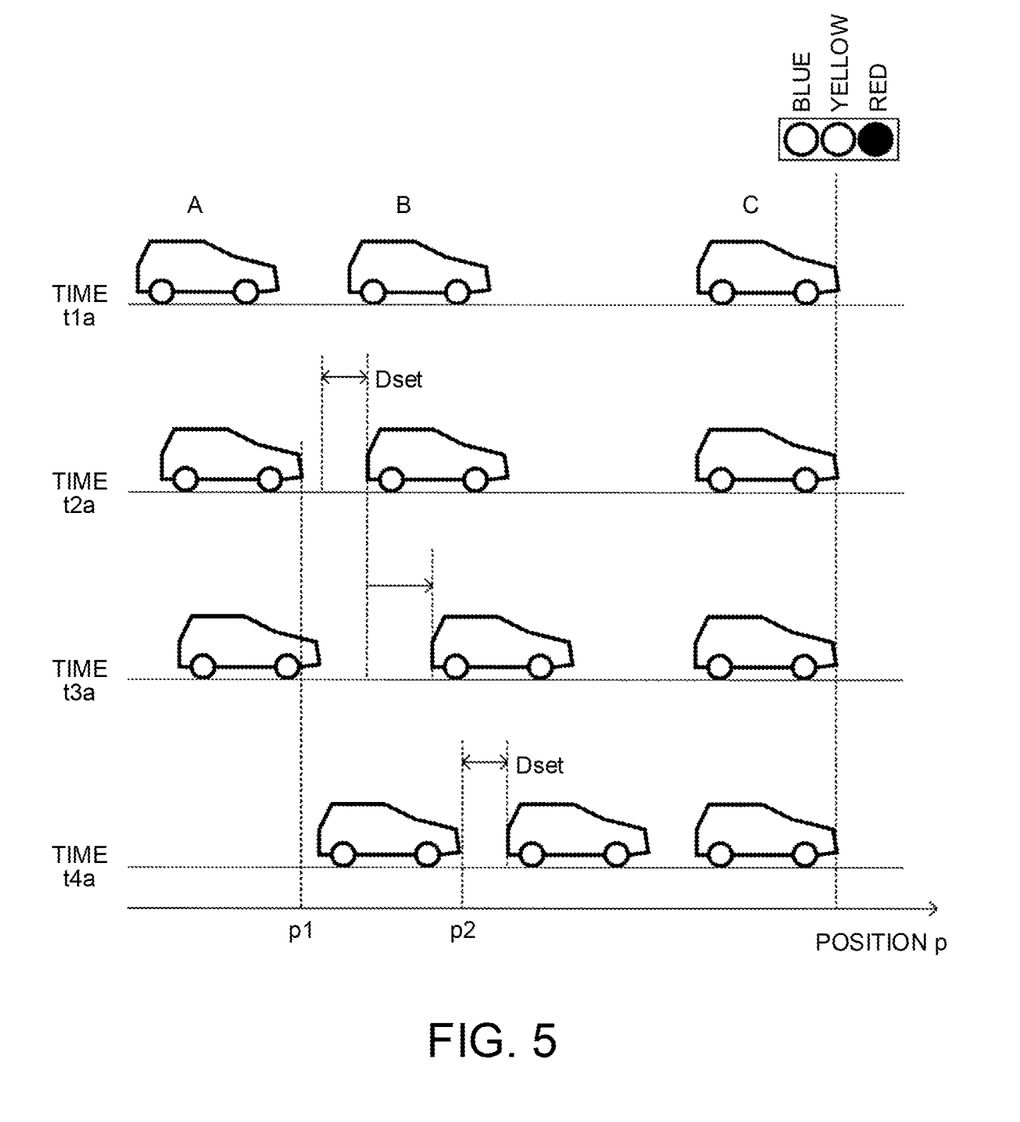
FIG. 5 is a view describing an example of behaviors of an host vehicle and a preceding vehicle when a color of a front traffic signal is red.
Figure 6:
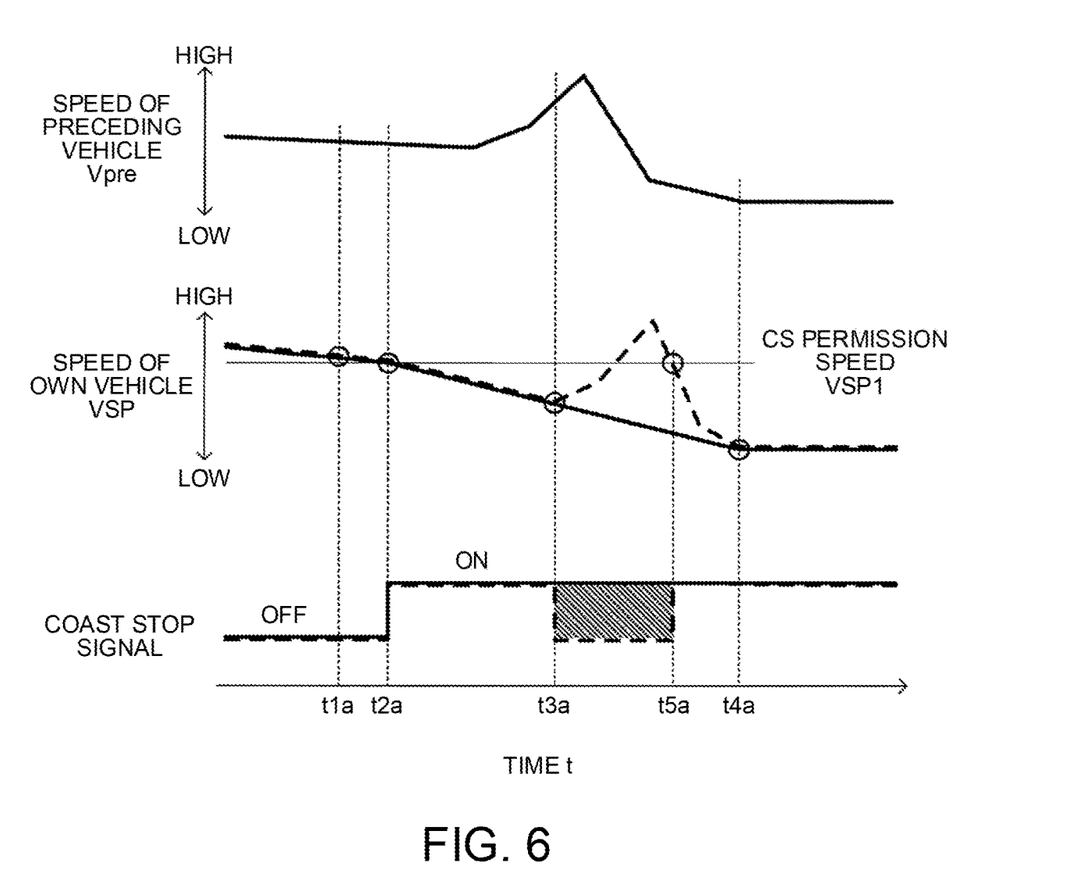
FIG. 6 is a view describing effects in the example shown in FIG. 5.

FIG. 5 is a view describing an example of behaviors of an host vehicle and a preceding vehicle when the color of the front traffic signal is red. FIG. 6 is a view describing effects in the example shown in FIG. 5. With reference to FIG. 6 as necessary, operations of the vehicle control system S according to this embodiment are described based on FIG. 5.

A case is assumed where another vehicle C in front of the preceding vehicle B is stopped before the front traffic signal showing a red light, and the host vehicle A and the preceding vehicle B are getting closer to the another vehicle C while the host vehicle A and the preceding vehicle B are decelerating in the same lane (time t1a). Here, the vehicle speed VSP exceeds the coast stop permission speed VSP1 even under the condition that the host vehicle A decelerates more than the preceding vehicle B does and the required driving force DFR is lower than the given value DFR1. Therefore, the coast stop flag Fcs is set to 0 (S107), and the engine E is operating.

When the host vehicle A decelerates further and the vehicle speed VSP reaches the coast stop permission speed VSP1, the coast stop flag Fcs is switched from 0 to 1 (S108) on conditions that there is no steering signal, and so on.

Since the color of the front traffic signal is red, the coast stop permission flag Fstp is set to 1 (S207) with regard to the engine E that is operating. Due to this, the coast stop is executed (S304), and fuel supply to the engine E is stopped (time t2a).

After execution of the coast stop, as the preceding vehicle B accelerates (time t3a), the required driving force DFR exceeds the given value DFR1 due to expansion of the intervehicular distance D, and the coast stop flag Fcs is switched from 1 to 0 (S107).

Here, in this embodiment, because the color of the front traffic signal is red, the engine restart permission flag Frst is set to 0 (S209) for the engine E that is automatically stopped by the coast stop, and restart of the engine E is prohibited. Therefore, the coast stop continues.

Thereafter, the host vehicle A gets closer to the preceding vehicle B in a state where the host vehicle A is decelerating while the engine E is kept stopped, and the host vehicle A stops at a position p2 (time t4a) at which a given intervehicular distance Dset remains from the preceding vehicle B that stops before the another vehicle C.

In FIG. 6, a solid line represents a coast stop signal in the case of this embodiment, and a broken line represents a coast stop signal in a case of a comparative example in which processing for determining cancellation permission for execution of the coast stop is not executed.

In the comparative example, when the intervehicular distance D expands due to acceleration of the preceding vehicle B after the time t2a, and the required driving force DFR increases and exceeds the given value DFR1 (time t3a), then the coast stop flag Fcs is switched from 1 to 0. As a result, the coast stop signal is turned into an off state, and fuel supply to the engine E is restarted, and the engine E is restarted. Thereafter, as the intervehicular distance D is reduced due to deceleration of the preceding vehicle B, the required driving force DFR is reduced, and, once the required driving force DFR reaches the given value DFR1, the coast stop flag Fcs is set to 1 again (time t5a), and the coast stop signal is turned into an on state, and the engine E is stopped.

On the other hand, in this embodiment, the engine restart permission flag Frst is set to 0 even in a period in which the coast stop signal is turned off in the case of the comparative example (time t3a to time t5a). Thus, the cancellation of the coast stop is prohibited, and the coast stop signal is kept in the on state.

Figure 7:
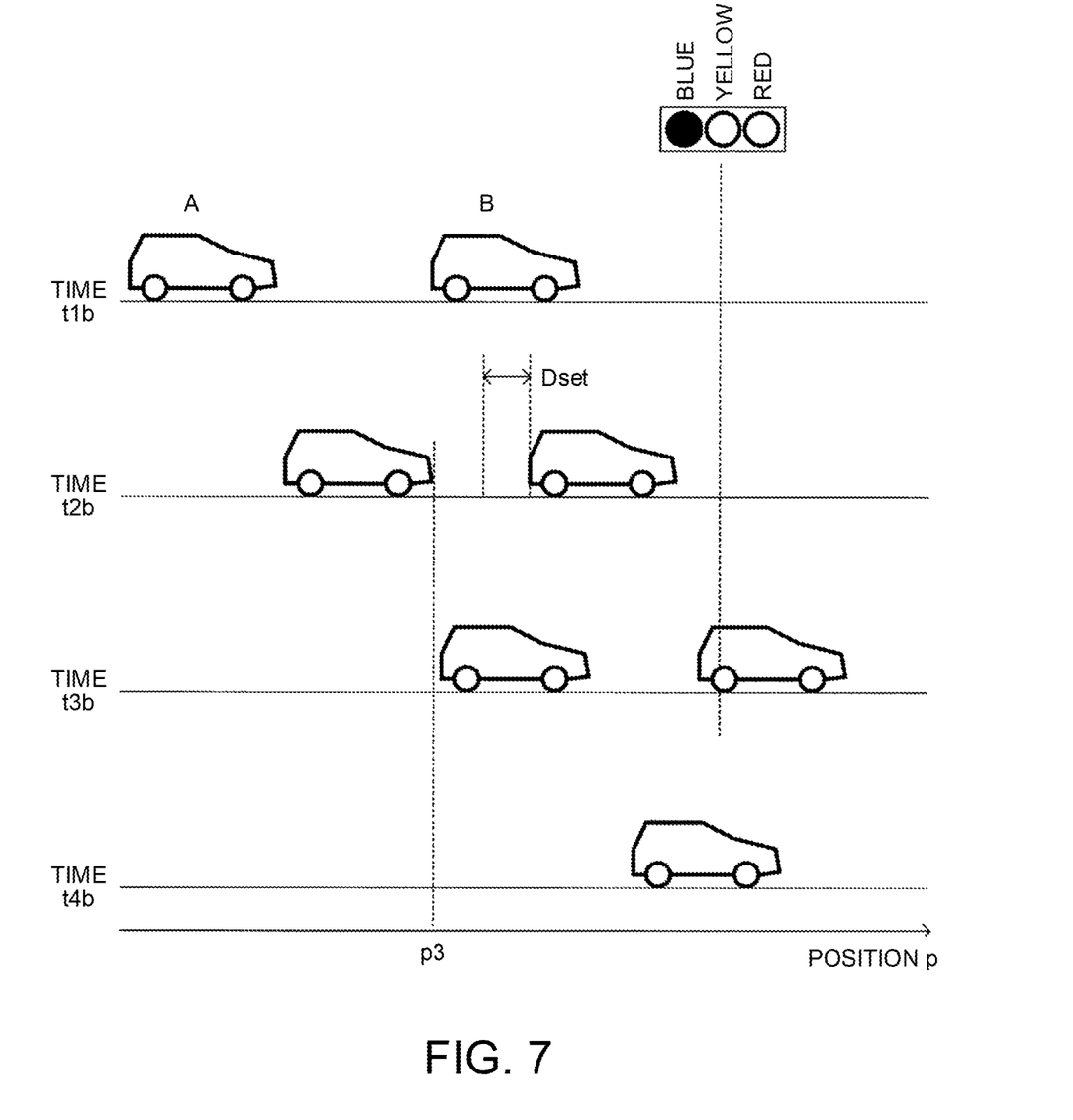
FIG. 7 is a view describing an example of behaviors of the host vehicle and the preceding vehicle when a color of the front traffic signal is blue.
Figure 8:
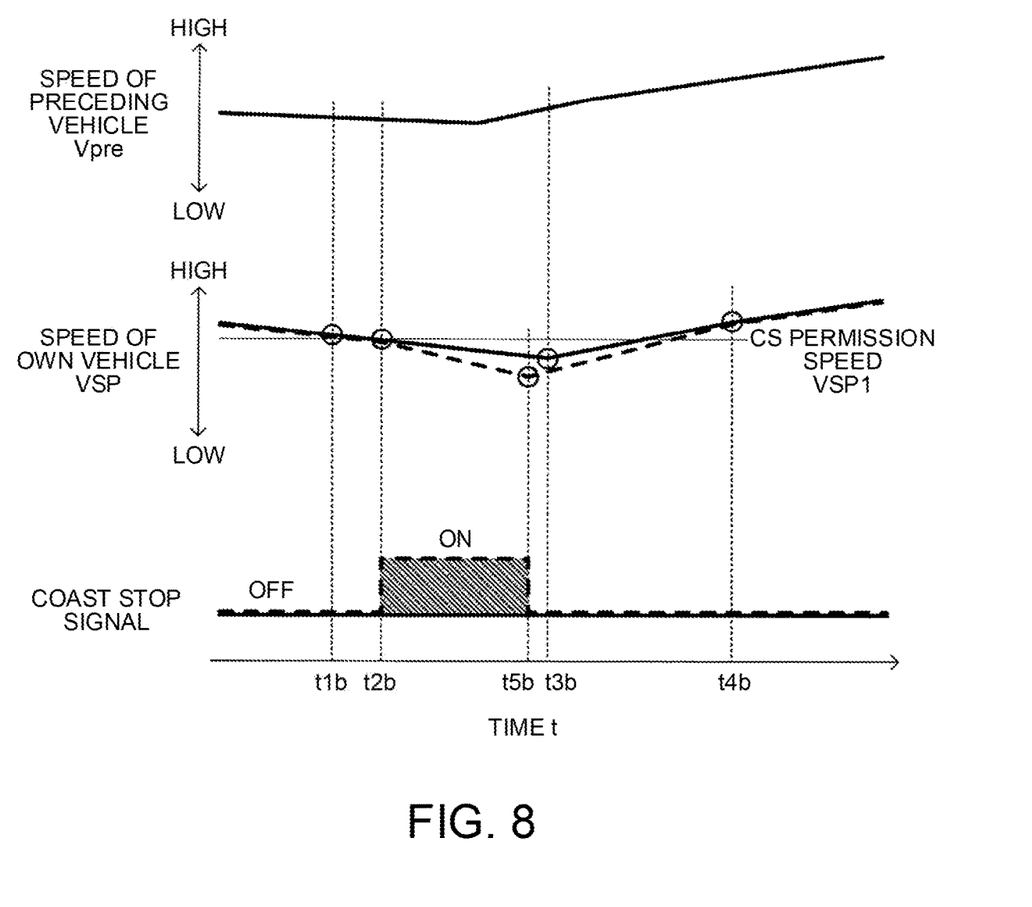
FIG. 8 is a view describing effects in the example shown in FIG. 7.

FIG. 7 is a view describing an example of behaviors of the host vehicle and the preceding vehicle when the color of the front traffic signal is blue, and FIG. 8 is a view describing effects in the example shown in FIG. 7. With reference to FIG. 8 as necessary, operations of the vehicle control system S according to this embodiment are described further based on FIG. 7.

A case is assumed in which the host vehicle A and the preceding vehicle B are getting closer to each other while the host vehicle A and the preceding vehicle B are decelerating towards the front traffic signal showing a blue light (time t1b). Similarly to the example shown in FIG. 5, since the host vehicle A decelerates more than the preceding vehicle B does, the host vehicle A is getting closer to the preceding vehicle B. Although this state satisfies the condition that the required driving force DFR is lower than the given value DFR1 as host vehicle A and the preceding vehicle B are decelerating, the coast stop flag Fcs is set to 0 (S107) because the vehicle speed VSP is higher than the coast stop permission speed VSP1. Thus, the engine E is operating.

When the host vehicle A decelerates further, and the vehicle speed VSP reaches the coast stop permission speed VSP1, the coast stop flag Fcs is switched from 0 to 1 (S108). Here, since the color of the front traffic signal is blue, the coast stop permission flag Fstp is set to 0 for the engine E that is operating (S206), and execution of the coast stop is prohibited. Thus, fuel supply to the engine E is continued, and the engine E is maintained in an idling state (time t2b).

Thereafter, as the preceding vehicle B accelerates (time t3b), the required driving force DFR exceeds the given value DFR1 due to expansion of the intervehicular distance D, and the coast stop flag Fcs is switched from 1 to 0 (S107).

Then, the host vehicle A keeps traveling in a state where a given intervehicular distance D between the host vehicle A and the preceding vehicle B is maintained, and the host vehicle A passes the front traffic signal on condition that the color of the front traffic signal remains blue (time t4b).

In FIG. 8, a solid line represents a coast stop signal in the case of this embodiment, and a broken line represents a coast stop signal in the case of a comparative example.

In the comparative example, when the vehicle speed VSP of the host vehicle A reaches the coast stop permission speed VSP1 (time t2b), the coast stop flag Fcs is switched from 0 to 1. As a result, the coast stop signal is turned into the on state, the coast stop is executed, and fuel supply to the engine E is stopped. Thereafter, when the intervehicular distance D expands due to acceleration of the preceding vehicle B, the required driving force DFR increases in order for the host vehicle A to follow the preceding vehicle B. Then, as the required driving force DFR reaches the given value DFR1, the coast stop flag Fcs is set to 0 again (time t5b), the coast stop signal is tuned into the off state, and the engine E is restarted.

On the other hand, in this embodiment, the coast stop permission flag Fstp is set to 0 even in a period in which the coast stop signal is turned into the on state in the case of the comparative example (time t2b to time t5a). Thus, execution of the coast stop is prohibited, and the coast stop signal is kept in the off state.

In this embodiment, a "control device for the self-driving vehicle" includes the engine E, the advanced driver assistance system control unit 1, the engine controller 2, the preceding vehicle detecting unit 16, and the intervehicular distance measuring device 17, and a "controller" includes the advanced driver assistance system control unit 1 and the engine controller 2.

Among the processing executed by the advanced driver assistance system control unit 1, the processing of S102 to S106 in the flowchart shown in FIG. 2 functions as a "coast stop execution determination unit", and the processing of S103 functions as a "required driving force setting unit". Further, the processing in S203, S205, and S208 in the flowchart shown in FIG. 3 function as a "preceding vehicle behavior predicting unit", the processing of S209 functions as a "coast stop release prohibiting unit", and the processing of S206 functions as a "coast stop execution prohibiting unit".

(Description of Actions and Effects)

The control device (the vehicle control system S) for the self-driving vehicle according to this embodiment is configured as described so far, and effects obtained from this embodiment are summarized as follows.

In this embodiment, the coast stop is executed for an self-driving vehicle during deceleration in which driving force is not necessary. Thus, unnecessary fuel consumption by the engine E is suppressed, and it is thus possible to reduce fuel consumption.

Here, when there is the preceding vehicle B in front of the host vehicle A, a behavior of the preceding vehicle B is predicted based on a situation in front of the preceding vehicle B. Then, when future deceleration of the preceding vehicle B is predicted in response to expansion of the intervehicular distance D (due to acceleration of the preceding vehicle B, for example) (for example, the color of the front traffic signal is red), restart of the engine E that is automatically stopped by the coast stop is prohibited, and the coast stop is thus continued. Thus, it is possible to avoid unnecessary restart and stop of the engine E in accordance with acceleration of the preceding vehicle B and deceleration of the preceding vehicle B thereafter, thereby suppressing deterioration of fuel consumption.

On the other hand, when future acceleration of the preceding vehicle B (including starting from a stopped state) is predicted in response to a reduction of the intervehicular distance D (due to, for example, deceleration or stop of the preceding vehicle B) (for example, the color of the front traffic signal is blue), execution of the coast stop for the engine E that is operating is prohibited, and the engine E is kept operating (for example, idling is continued). Because of this, it is possible to avoid unnecessary stop and restart of the engine E in accordance with deceleration of the preceding vehicle B and acceleration of the preceding vehicle B thereafter, thereby restraining deterioration of fuel consumption.

Further, the traveling state of the host vehicle A relative to the preceding vehicle B is detected, and the required driving force DFR is set so that the relative speed RVS is 0 when the intervehicular distance D between the host vehicle A and the preceding vehicle B is the predetermined distance Dset. Thus, it is possible to provide specific means for allowing the host vehicle A to travel while maintaining the predetermined distance Dset.

In the foregoing description, the color of the front traffic signal is used as a situation in front of the preceding vehicle B. However, the invention is not limited to this. It is also possible to use a situation of a railway crossing, presence or absence of a pedestrian, as well as a behavior of the another vehicle C in front of the preceding vehicle B, and so on. Based on these situations, it is possible to predict acceleration or deceleration of the preceding vehicle B. For example, it is possible to predict deceleration of the preceding vehicle B when a gate of a railway crossing in front of the preceding vehicle B is closed, or when there is a pedestrian in front of the preceding vehicle B. Further, it is also possible to predict deceleration of the preceding vehicle B when the another vehicle C in front of the preceding vehicle B is stopped, or decelerates relative to the host vehicle A.

Further, the relative speed RVS of the host vehicle A relative to the preceding vehicle B, the intervehicular distance D, and so on may be detected not only by sensors (the camera sensor 16, the radar sensor 17), but also by communication among the vehicles.

The embodiment of the invention has been described so far. However, the above embodiment only shows a part of application examples of the invention, and is not intended to limit the technical scope of the invention to the specific configuration of the embodiment. Various changes and modifications can be made in the above embodiment without departing from the scope of the claims.

The invention claimed is:

1. A control device for a self-driving vehicle, comprising:
an engine serving as a driving source of the self-driving vehicle; and a controller that controls an operation of the engine, wherein the controller is programmed to:
  set a required driving force of the self-driving vehicle such that a relative speed of the self-driving vehicle to a preceding vehicle in front of the self-driving vehicle becomes 0, the relative speed being a speed when an intervehicular distance between the self-driving vehicle and the preceding vehicle becomes closer to a predetermined distance;
  execute a coast stop, the coast stop being for automatically stopping the engine in accordance with the required driving force during the self-driving vehicle traveling at a speed not more than a predetermined vehicle speed;
  detect a color of a traffic signal in front of the preceding vehicle in a traveling direction as a situation in front of the preceding vehicle;
  continue the coast stop in response to detecting the color of the traffic signal to be a color that encourages the preceding vehicle to stop or decelerate during an automatic stop of the engine by the coast stop even though the required driving force is not a value for executing the coast stop.

2. A control device for a self-driving vehicle, comprising:
an engine serving as a driving source of the self-driving vehicle; and
a controller that controls an operation of the engine, wherein the controller is programmed to:
  set a required driving force of the self-driving vehicle such that a relative speed of the self-driving vehicle to a preceding vehicle in front of the self-driving vehicle becomes 0, the relative speed being a speed when an intervehicular distance between the self-driving vehicle and the preceding vehicle becomes closer to a predetermined distance;
  execute a coast stop for automatically stopping the engine in accordance with the required driving force during the self-driving vehicle traveling at a speed not more than a predetermined vehicle speed;
  detect a color of a traffic signal in front of the preceding vehicle in traveling direction as a situation in front of the preceding vehicle; and
  prohibit execution of the coast stop for the engine in response to detecting the color of the traffic signal to be a color that permits the preceding vehicle to pass, during the operation of the engine even though the required driving force is a value determined for executing the coast stop.

3. A control device for a self-driving vehicle, comprising:
an engine serving as a driving source of the self-driving vehicle; and
a controller that controls an operation of the engine, wherein the controller is programmed to:
  set a required driving force such that a relative speed of the self-driving vehicle to a preceding vehicle in front of the self-driving vehicle becomes 0, the relative speed being a speed when an intervehicular distance between the self-driving vehicle and the preceding vehicle becomes closer to a predetermined distance;
  execute a basic coast stop control during the self-driving vehicle traveling at a speed not more than a predetermined vehicle speed, the basic coast stop control comprising:
    executing a coast stop for automatically stopping the engine in response to the required driving force being equal to or smaller than a given value, and
    prohibiting the coast stop in response to the required driving force exceeding the given value;
  detect a color of a traffic signal in front of the preceding vehicle in a traveling direction as a situation in front of the preceding vehicle, when executing the coast stop in accordance with the basic coast stop control; and
  in response to detecting the color of the traffic signal to be a color that encourages the preceding vehicle to stop or decelerate, continue the coast stop even though the required driving force exceeds the given value.

4. A control device for a self-driving vehicle, comprising:
an engine serving as a driving source of the self-driving vehicle; and
a controller that controls an operation of the engine, wherein the controller is programmed to:
  set a required driving force such that a relative speed of the self-driving vehicle to a preceding vehicle in front of the self-driving vehicle becomes 0, the relative speed being a speed when an intervehicular distance between the self-driving vehicle and the preceding vehicle becomes closer to a predetermined distance;
  execute a basic coast stop control during the self-driving vehicle traveling at a speed not more than a predetermined vehicle speed, the basic coast stop control comprising:
    executing a coast stop for automatically stopping the engine in response to the required driving force being equal to or smaller than a given value, and
    prohibiting the coast stop in response to the required driving force exceeding the given value;
  detect a color of a traffic signal in front of the preceding vehicle in a traveling direction as a situation in front of the preceding vehicle, when prohibiting execution of the coast stop in accordance with the basic coast stop control; and
  in response to detecting the color of the traffic signal to be a color that permits the preceding vehicle to pass, continue prohibition of the execution of the coast stop even though the required driving force being equal to or smaller than the given value.

* * * * *